Sept. 6, 1955  H. P. LUHN  2,717,121
KEYBOARD
Original Filed Jan. 19, 1949  7 Sheets-Sheet 1

INVENTOR.
HANS P. LUHN
BY Robert S. Dunham
ATTORNEY.

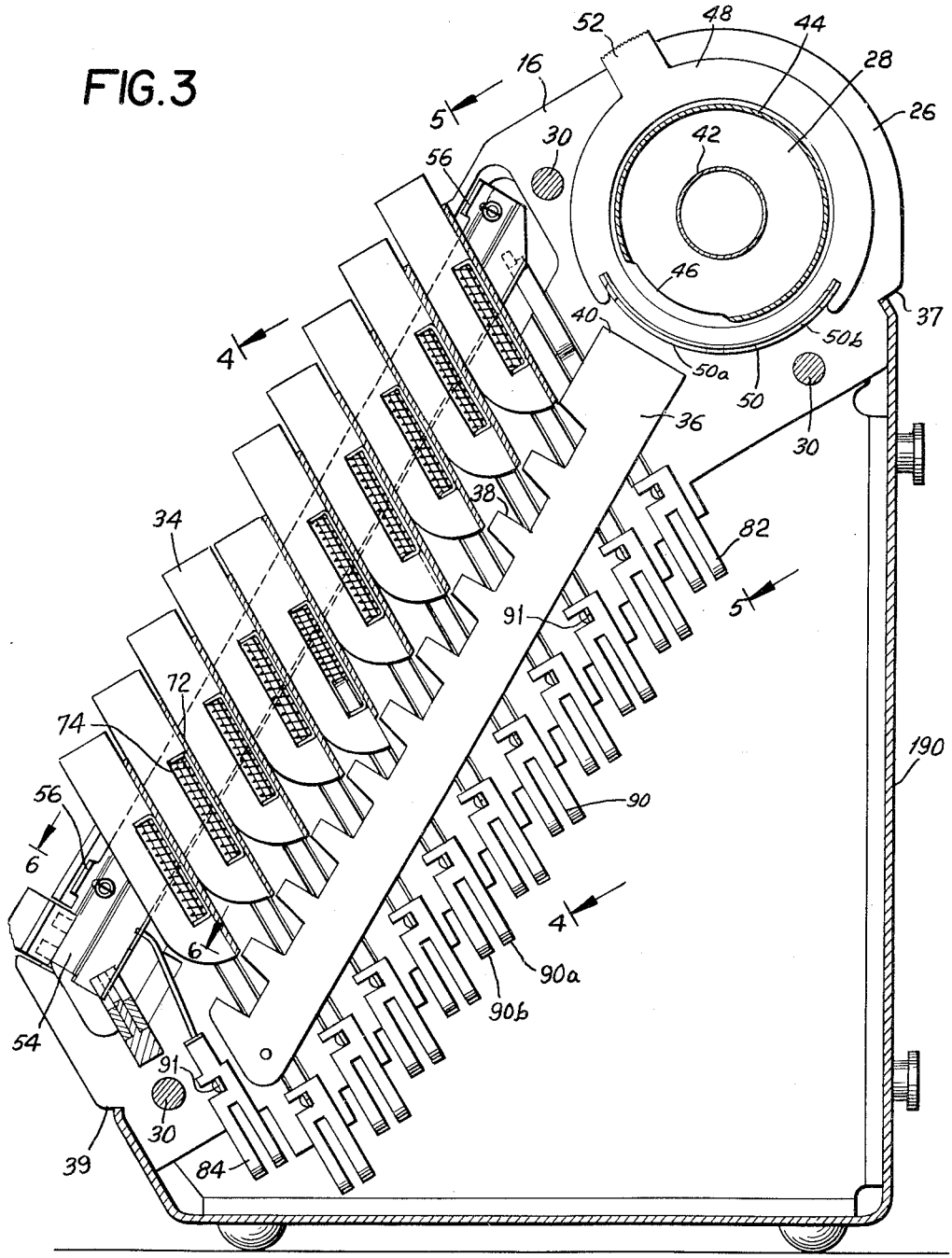

Sept. 6, 1955            H. P. LUHN            2,717,121

KEYBOARD

Original Filed Jan. 19, 1949            7 Sheets-Sheet 3

INVENTOR.
HANS P. LUHN
BY Robert S. Dunham
ATTORNEY.

Sept. 6, 1955 H. P. LUHN 2,717,121
KEYBOARD
Original Filed Jan. 19, 1949 7 Sheets-Sheet 4
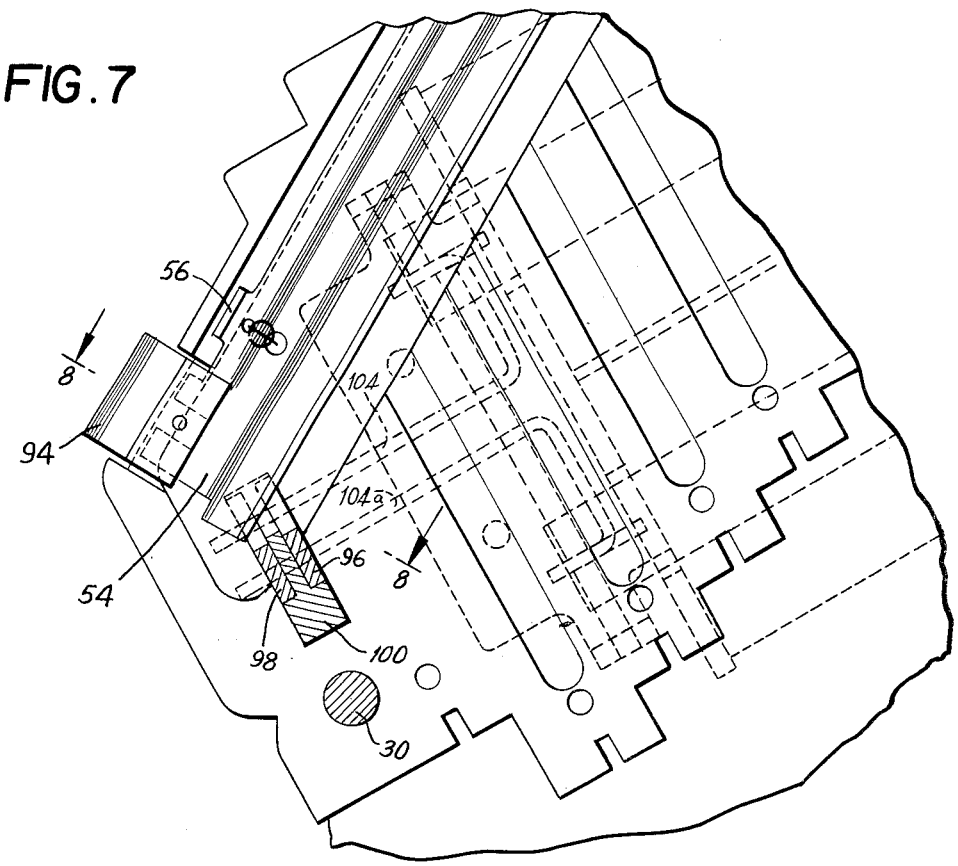
FIG. 7
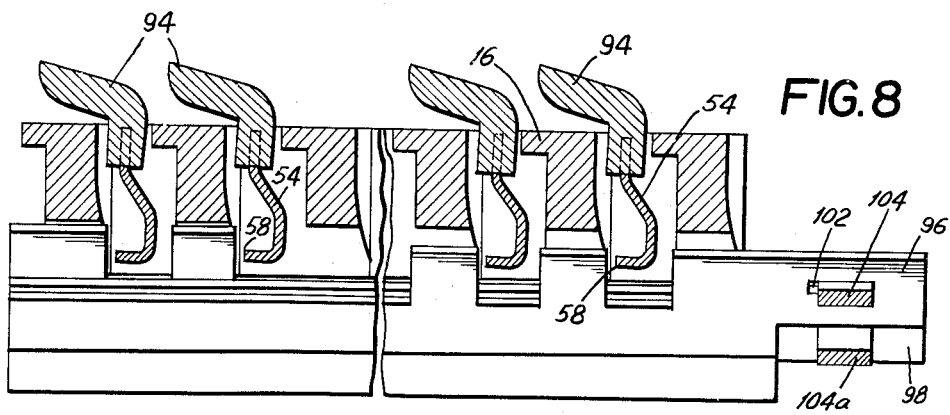
FIG. 8
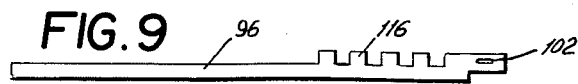
FIG. 9
FIG. 10
INVENTOR.
HANS P. LUHN
BY
Robert S. Dunham
ATTORNEY.

Sept. 6, 1955 H. P. LUHN 2,717,121
KEYBOARD
Original Filed Jan. 19, 1949 7 Sheets-Sheet 5

INVENTOR.
HANS P. LUHN
BY
*Robert L. Denham*
ATTORNEY.

Sept. 6, 1955            H. P. LUHN            2,717,121
KEYBOARD
Original Filed Jan. 19, 1949            7 Sheets-Sheet 6
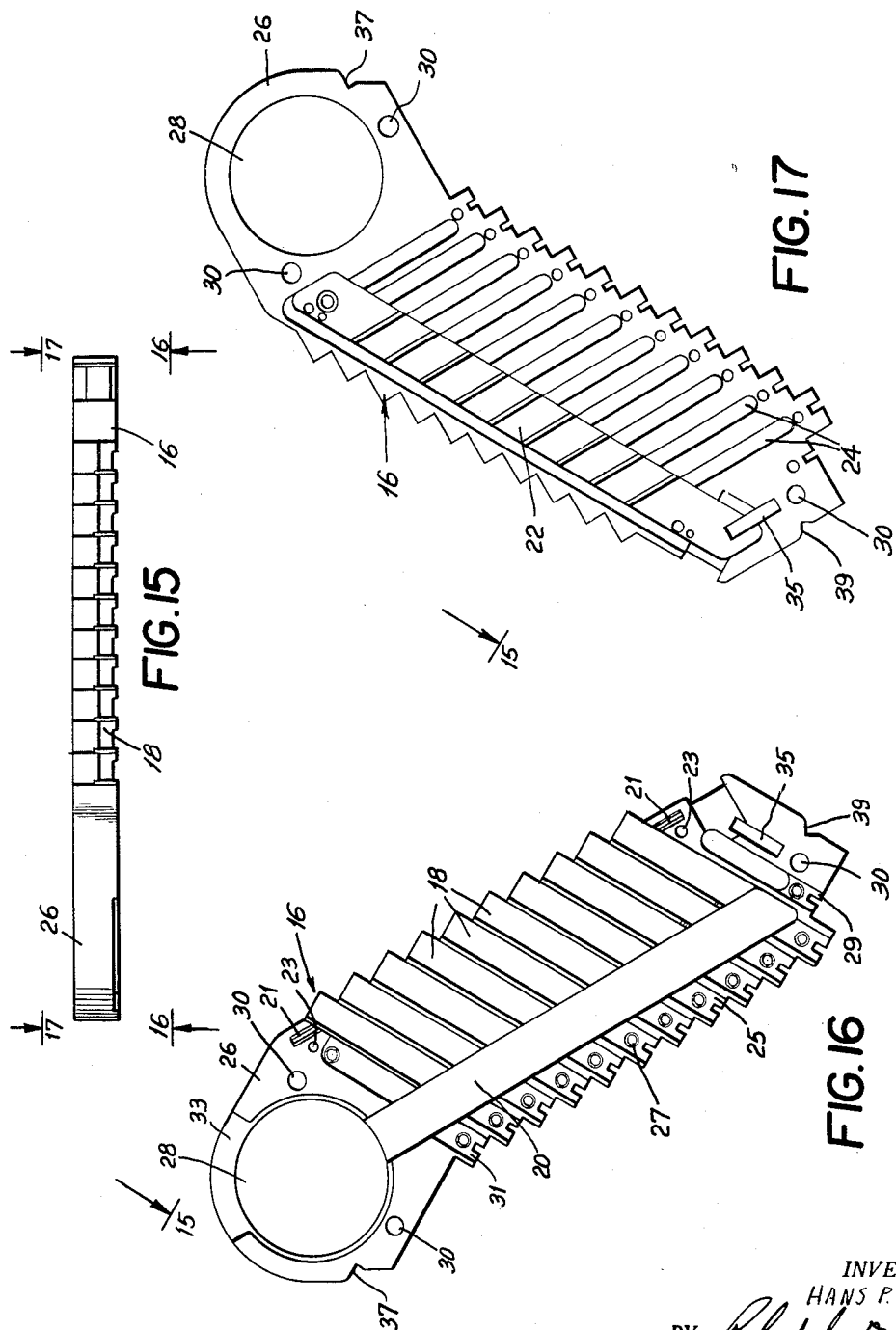
INVENTOR.
HANS P. LUHN
BY
ATTORNEY.

Sept. 6, 1955  H. P. LUHN  2,717,121
KEYBOARD

Original Filed Jan. 19, 1949  7 Sheets—Sheet 7

INVENTOR.
HANS P. LUHN
BY Robert S. Dunham
ATTORNEY.

United States Patent Office 2,717,121
Patented Sept. 6, 1955

2,717,121

KEYBOARD

Hans P. Luhn, Armonk, N. Y., assignor to International Business Machines Corporation, New York, N. Y., a corporation of New York Original application January 19, 1949, Serial No. 71,734. Divided and this application October 27, 1950, Serial No. 192,581

15 Claims. (Cl. 235—145)

This invention relates to a keyboard. More particularly this invention relates to an electrical keyboard of the kind shown in my application for patent Serial No. 71,734, filed January 19, 1949, of which this application is a division.

It is an object of the invention to provide a keyboard having reset mechanism of a highly flexible nature. This objective is attained in a keyboard having a plurality of denominational banks of keys and a latching bail associated with each key bank for latching a depressed key in operative position by providing in such structure means for manually resetting any given bank of keys and electromechanical means to which the resetting device of the respective banks may be selectively connected for electromechanically resetting such selectively connected banks, without in any way impairing their manual reset function.

It is a still further object of the invention to provide a novel keyboard assembly wherein key supporting separators of substantially uniform character may be assembled into a keyboard structure. This objective is attained by providing a plurality of interfitting key bank separators or supports, each consisting of an elongated body of substantial width and thickness, the separators or supports being adapted for face-to-face assembly so that a plurality of such elements may be united to constitute a keyboard structure.

It is another object of the invention to provide a novel combination of mechanical and electrical elements that will combine functionally to greatly reduce the number of keyboard parts and thereby render possible the assembly of a keyboard with the greatest economy of time and materials.

Other objects and advantages of the invention will appear as the particular description thereof proceeds in light of the drawings forming a part of this application, and in which drawings:

Fig. 3 is a cross-sectional view through the keyboard on line 3—3 of Fig 1;

Fig. 7 is a fragmentary elevational view of the lower end of the keyboard structure;

Fig. 8 is a cross-sectional view on line 8—8 of Fig. 7;

Fig. 9 illustrates a common reset bar;

Fig. 10 illustrates another common reset bar;

Fig. 15 is a view looking towards the upper edge of a key bank separator molding, as from the line 15—15 of Fig. 16;

Fig. 16 is a view of one face of the key bank separator, viewed from line 16—16 of Fig. 15;

Fig. 17 is a view of the other face of the key bank separator, viewed from line 17—17 of Fig. 15;

Figure 1:
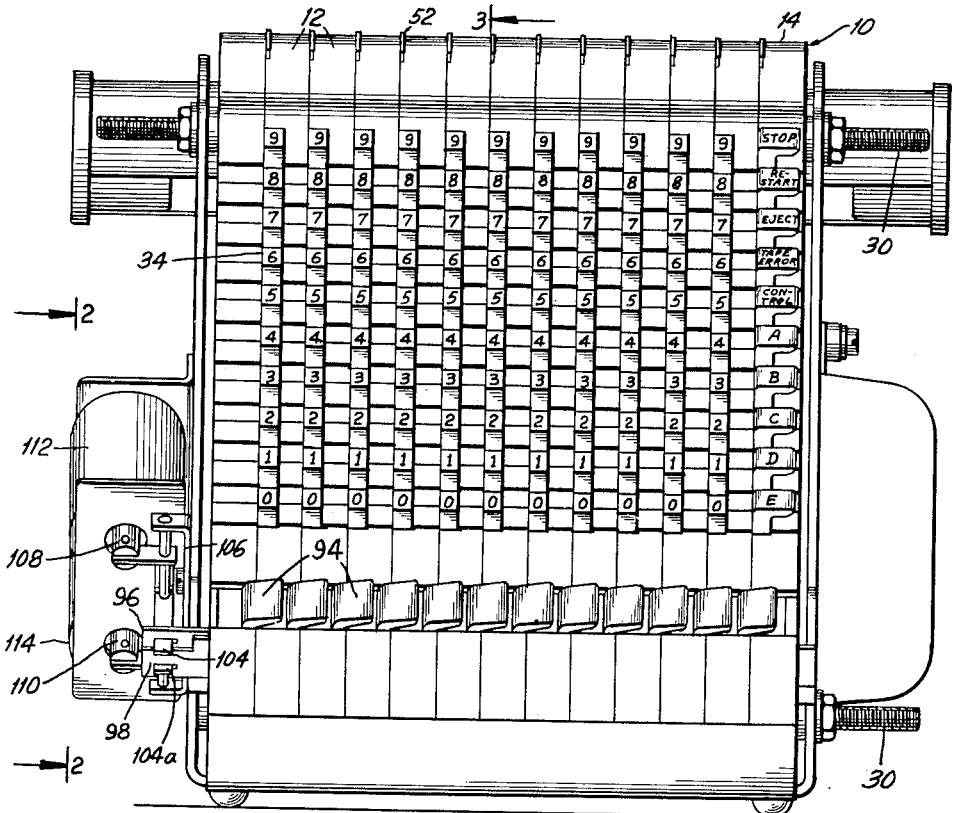
Fig. 1 is an elevational view looking towards the face of the keyboard.

The keyboard storage device 10 includes a plurality of key banks, each bank containing a plurality of keys. Herein the keyboard is illustrated as consisting of 11 banks of denominational keys 12, and one bank of functional keys 14. Each bank of keys is supported on a separator molding 16, which itself consists of an elongated body of molded material, such as phenolic resin. The separator has substantial width and the thickness is such as to accommodate in the faces thereof appropriate guide passages and cavities to accommodate functional operative parts. For example, in one face of each separator molding are a plurality of guideways 18 for accommodating the keys of that particular key bank. The guideways 18 are adapted to confine keys mounted therein to an operative reciprocatory path. The same face of the separator molding has therein a longitudinal passageway 20 constituting a light path, as will appear hereinafter.

The opposite face of the separator molding has formed therein a longitudinally extending recess 22, which is designed to accommodate the movement of a key-latching bail, as will appear more fully hereinafter. The same face of the molding has downwardly extending slots 24, in each of which is adapted to rest a key terminal, as will appear hereinafter. The upper end of each separator molding has formed thereon a head 26, through which extends a cylindrical passage 28. Furthermore, each separator molding has a plurality of transverse passages, which are designed to accommodate tie rods 30, by means of which a plurality of separator moldings may be joined in face-to-face relation to provide an operative keyboard structure.

In each of the key guideways 18 is mounted a key 34 for reciprocating movement into open and closed position. Each of the keys 34 is formed of light conducting material, such as, for example, methyl methacrylate resin, which is known by the trade name Lucite. Lucite has the property of conducting light rays along the length of a body thereof without material loss in a lateral direction.

The keyway intersecting passageway 20 constitutes a light path of channel form along which light rays may be directed for illuminating a depressed light conducting key whose lower end extends into the channel. The channel may assume any appropriate cross-sectional form for most effectively confining light rays along the path. Herein the passageway has been illustrated as having a uniform cross-sectional shape and size along its length.

The size and shape from end to end thereof may, however, vary.

It may prove desirable to provide an aid to the passage of light rays along the passageway 20 to assure that all the keys, even those remote from the light source, receive an effective amount of light. To this end a specific aid has been incorporated into the structure. The keyway intersecting passageway 20 may have positioned therein a Lucite light conducting member 36, the position of the same being such that it intersects the path of movement of a key 34 when the key is depressed. As more clearly seen in Figure 3 of the drawing, the light conducting member 36 is notched along its upper face and the notches 38 are so positioned as to receive and accommodate the lower end of the keys 34 when any one of them is depressed. The upper end 40 of the light conducting member 36 is exposed to a light source, and as a consequence of this arrangement light rays that fall on the end 40 of the light conducting member are carried along the light conducting member in parallel relation without substantial lateral loss, and if any of the keys are depressed so that the lower end of a depressed key extends into a notch 38 in the upper face of the light conducting member 36, the light rays transmitted along the light conducting member are carried into the depressed key where they are deflected by an appropriately shaped surface, and thence along the body thereof and through the exposed operating face. It will be seen that, while all of the keys may have an incidental luminous glow, any of the depressed keys will have a distinctly illuminated face and thus stand out in contrast to keys that are in nondepressed position.

The structure herein furthermore includes common means for illuminating all of the light conducting channels of a plurality of key banks, and furthermore means for selectively shifting color screens into the path of light between the light source and the light conducting channel. Thus, within the longitudinal cylindrical passage formed at the head 26 of a plurality of assembled separator units, is positioned a lamp 42, which is preferably of an elongated type, so that a substantially equal amount of illumination is provided for each of the light conducting members across the entire width of the keyboard. The lamp herein is encased in a reflector shield 44, which has a longitudinally extending light window 46 arranged in alignment with the upper end 40 of the light conducting members 36.

Arranged about the reflector 44 is a color band ring 48, which may be particular to an individual bank or common to a plurality of banks. A segment of the color band ring is adapted to hold a color band 50. The band may consist of a single color filter or a plurality thereof. Thus, the filter 50a, for example, may pass only red light, while the filter 50b may pass only green light. By operating the color band ring projection 52 either one or the other color filter may be moved into the path of light between the lamp 42 and the adjacent ends of the light conducting channels 20. It follows, therefore, that either adjacent banks or adjacent groups of banks may be illuminated differently for distinguishing the depressed keys of such banks even more sharply.

The keyboard device herein is of the type designed for the control of electrical instrumentalities found in certain types of intelligence transmitting devices and computing machines, and consequently, it has been provided with appropriate structure for completing electrical circuits for operating such instrumentalities upon the depression of a key or keys in any given bank or banks. Furthermore, mechanism has been provided for temporarily latching a key in depressed circuit making position.

Figure 6:
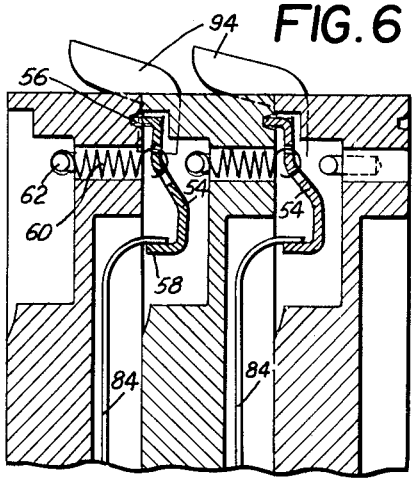
Fig. 6 is a cross-sectional view on line 6—6 of Fig. 3.
Figure 11:
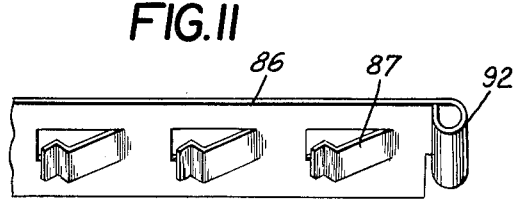
Fig. 11 is a fragmentary view of a common electrical connector.

Each bank of keys has associated therewith a common key bail 54, which, as more clearly shown in Fig. 6, is mounted by means of mounting ears 56 at a plurality of points 21 along the length of its associated separator molding. The free end 58 of each bail is urged towards its associated separator molding by means of a spring 60 which has one end thereof attached to the bail and the other end to an anchor 62. As a consequence of this mounting, the bail is yieldingly urged into key-latching position and is, therefore, effective to hold a key of its bank in depressed position until either another key in the same bank is depressed or reset mechanism is operated for its release.

Each key has a key latching cam or contact plate 64 fixed to one face thereof. The cam is formed of conducting material and is of such configuration as to present a notch 66 in one edge thereof to the inturned lower free edge 58 of the latching bail when the key is in its inoperative position. Immediately above the notch 66 is an outwardly inclined cam surface 68, which normally overlies the inturned free edge 58 of the latching bail. The cam surface 68 terminates in a shoulder 70, which is designed to hold a key in depressed position by engagement with the lower face of the free edge 58 of the key latching bail.

The depression of a key will force the cam surface 68 into contact with the free inturned edge 58 of the bail and continued downward movement of the key will swing the bail outwardly about its pivot at the mounting ears 56 and against the tension of the spring 60. When the free edge of the bail has passed the camming surface 68, the spring 60 will serve to positively draw the free edge 58 of the bail into contact with the latching shoulder 70 and thereby effectively retain the key in depressed position. The key will remain latched under the bail until another key in the same bank is depressed or until reset mechanism is either manually or automatically operated to rock the bail and thereby release the key.

A depressed key will return to its normal inoperative position under the influence of a spring 72, which is carried by a recess 74 in one face of the key. Each key has associated therewith a conductor and terminal 75, and the same is provided with a lateral offset 76 which extends into the recess 74 of the key and engages the latching cam 64. Extending upwardly from the offset of the terminal is a staff 78, about which the spring 72 is positioned. The staff 78 extends upwardly into a clearance slot 80, which is formed in the key and which opens downwardly into the recess 74. The key terminal 75 is in conductive contact with the key latching cam and contact plate 64.

Each bail has a bail terminal associated with opposite ends thereof. As best seen in Fig. 3 of the drawing, one terminal 82 is carried by an associated separator and extends downwardly therefrom in proximity to the upper end of an adjacent bail. Another terminal 84 is fixed to and extends downwardly from the lower end of the bail. One of the terminals 82 or 84 is normally connected to a source of electric currrent. When no key of a given bank is depressed, there is a current path from terminal 82, through the key latching bail, and through the bail terminal 84. In this regard it is to be noted that the inturned edge 58 of the bail lies opposite the notch 66 in the key latching cam 64 when the key is in its inoperative position, and consequently, the bail is insulated from the key latching cams by the intervening space. Should, however, a key be depressed, the key latching cam and particularly the shoulder 70 thereof will lie in conducting contact with the inturned lower edge 58 of the bail, and as a result of this connection a current path will be established through bail terminal 84, the bail, the key latching cam of a depressed key and through the key terminal 75 to a conductor (not shown).

Figure 5:
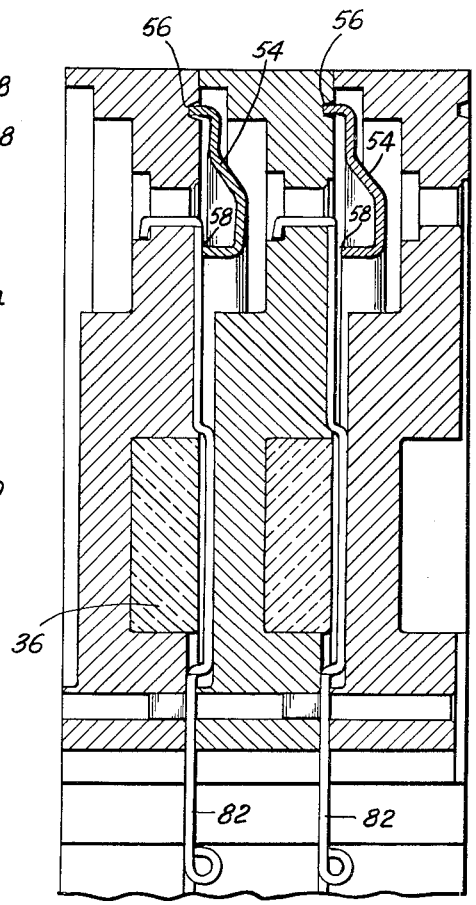
Fig. 5 is a transverse cross-sectional view on line 5—5 of Fig. 3.

By reference to Fig. 5 it will be specifically noted that the bail at the left of the figure is in circuit making contact with the bail terminal 82. This is the normal position of these respective parts before any key of a bank has been depressed. The bail and bail terminal relationship shown at the right of Fig. 5 is that which prevails when a key of that particular bank has been depressed. It will be noted therein that the bail has been swung to the right, and as a consequence contact between the lower inturned edge of the bail and the bail terminal has been broken.

It will be understood that each bail is provided with terminals and that each key has an associated key terminal. Operating current is impressed on a key terminal by depressing the key and such current may be taken from the individual key terminal. For certain modes of operation, however, it may be convenient to use a common connector 86 for connecting the denominational rows of a plurality of banks. The common connector 86 consists of a conducting strip having a plurality of ears 87 struck upwardly from one face thereof, each ear being so located and arranged as to engage with the bifurcated lower ends 90 of the key terminals. The conducting strip 86 is of such length and has a sufficient number of upstruck ears 87 to extend across the entire keyboard and to contact with the bifurcated ends of all the keys in any given row. The connector 86 may have a ferrule 92 at one end thereof for receiving the end of a conductor, although the connection may be made to one of the ears of the outer key terminal. In this regard it may be noted that the lower end of the key terminals 90 provide a pair of ears 90a and 90b, which afford means for attaching separate leads to a single terminal if the operation being performed should require such connections. In effecting this, one of the ears, 90a or 90b, of each terminal is bent laterally so that the ears are offset with respect to one another and are thereby accessible for making separate plug wire connections.

Allusion has been made herein to a novel combination of mechanical and electrical elements that combine functionally in support of each other with a resultant reduction in parts and simplification of the keyboard structure. These desirable qualities flow from the novel relation of the key bank separator, the keys, and the few related parts which provide key banks that are complete operative units adapted for assembly into a keyboard structure of any desired number of banks. These elements and combinations are now to be described with particular reference to Figs. 15 through 20.

Figs. 15 through 17 show the details of a molded key bank separator or support, the same having been referred to hereinbefore by the reference numeral 16. In brief recapitulation, it will be remembered that the separator has a plurality of key guideways 18 which are intersected by a generally longitudinal light passage or channel 20 on one face thereof and on the other face thereof the body is relieved in a longitudinal direction to provide a recess 22 to accommodate an adjacent key bail. Thereunder are a series of transverse slots 24 extending downwardly to provide clearance for key terminals.

In further detail, it will be observed with particular reference to Fig. 16 that the separator face therein shown includes a slot 21 at each end thereof for receiving key-latching bail mounting ears. Directly under the slots 21 are through passages 23, through which the bail spring 60 may be extended for anchorage against the opposite face of the separator.

At the lower end of each key guideway 18 is a seat 25, which is adapted to support the lower end 90 of the key terminals 75. Each seat has therein a passage 27 adapted to receive a terminal spur 91 (Fig. 12) for anchoring the terminal in position on its seat. The lower bail terminal 84 is mounted on the seat 29, while the upper bail terminal 82 is mounted on the seat 31 at the upper end of the separator body. The intermediate seats are all designed for the reception of operative key terminals. A clearance 33 is provided at one face of the head section 26 for the reception of the color band rotating projection 52.

The opposite face of the separator body is shown in Fig. 17 and the same is distinguished from the first face thereof by the aforementioned clearances 22 and 24, which are provided for key bail clearance and for the accommodation of terminal elements respectively. Each separator has a through transverse passage 35 at the lower end thereof, through which the reset bails 96, 98, 126 and 128 may extend and in which they may be reciprocated during reset operations. Each separator has a seat formed at opposite ends thereof for mounting the same in a supporting frame or casing. Thus, an upper seat 37 is adapted to support the upper end of the separator, while a lower seat 39 is adapted to support the lower end of the separator in operative position on the keyboard casing 190 or on a separator frame.

The structure of the keys 34 normally mounted for operation in the separator keyways 18 is such as to provide a mounting for electrical elements that are rendered operative by key manipulation. The key recess 74 opens outwardly through three faces of the key and provides a cavity in which current conducting members are carried. Specifically, it will be observed that the recess 74 not only has an upwardly extending clearance slot 80, but also a ridge 81 in the bottom thereof for more securely anchoring the contact plate 64. The contact plate 64 has inturned ends 65 and 67. The inturned end 65 includes two fingers which lie in contact with the upper wall of the key recess 74 and a third finger 69, which extends upwardly and inwardly into the clearance slot 80. This structure firmly positions the upper end of the contact plate 64. The lower inturned end of the contact plate 64 lies in contact with the bottom wall of the key recess, and this end of the plate is centrally slotted to straddle the rib 81 that extends upwardly from the bottom wall of the recess. By this means the lower end of the contact plate is firmly and accurately positioned.

Figure 18:
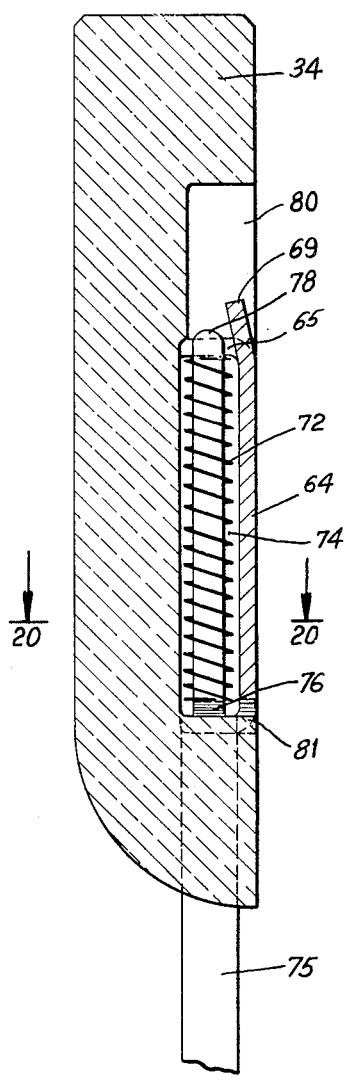
Fig. 18 is an enlarged longitudinal cross-sectional view of a key, the key being in inoperative or non-depressed position.
Figure 19:
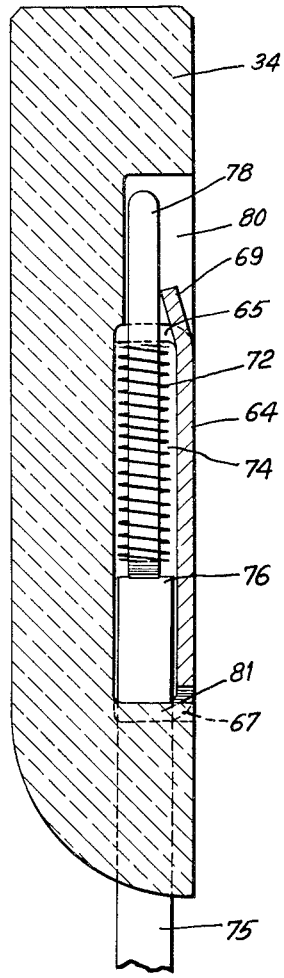
Fig. 19 is an enlarged longitudinal cross-sectional view of a key, the keys being in operative or depressed position.
Figure 20:
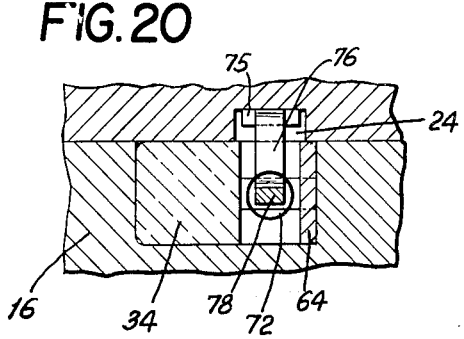
Fig. 20 is a transverse cross-sectional view on the line 20—20 of Fig. 18.

As more particularly shown in Figs. 18 and 19, the key terminal member 75 extends upwardly along one face of the key and the terminal offset 76 enters the key recess 74 at one of its open sides rotatively removed from the face in which the contact plate 64 is seated. The reduced staff 78, which extends upwardly from the offset portion of the upper end of the key terminal, extends freely through the slot formed between the two inturned fingers at the upper end of the contact plate 64, so that the key may be reciprocated with respect to the terminal staff 78 and thereby be brought into contact-making or reset position. The spring 72, which surrounds the terminal staff 78, normally retains the key 34 in its non-depressed or inoperative position. Inasmuch as the terminal staff spring 72 is in contact at one of its ends with the inturned end 65 of the contact plate 64, and at its other end with the offset or inturned shoulder 76 of the key terminal, it will be apparent that a current path is established from the contact plate 64, through the spring 72 and to the terminal 76. It further follows that depression of a key will place the spring 72 under compression and thereby assure even better conductive contact between the contact plate 64 and the key terminal 72. The foregoing key assembly is such that the electrical elements are carried by a mechanical functional element, which thereby eliminates separate supporting structure and the like.

One of the objectives of the invention is the provision of a keyboard structure having the utmost resetting flexibility. Accordingly, each key bank is provided with manual reset means and in an optional form of the reset structure there has been provided a plurality of common reset bars, to which any one of the key banks may be operatively connected at the option of the operator.

Each key latching bail 54 has attached thereto a manual reset key 94, this key being mounted on the lower end of the bail and being such that a manual operation thereof will rock the bail about its pivot ears 56 and thereby manually release any key that may have been latched in depressed position. The reset mechanism may optionally include a pair of bail reset bars 96 and 98, which extend transversely across the bottom of the keyboard and which are common to the several key latching bails of the keyboard banks. The reset bars are mounted for reciprocating movement on a reset bar separator 130.

Figure 2:
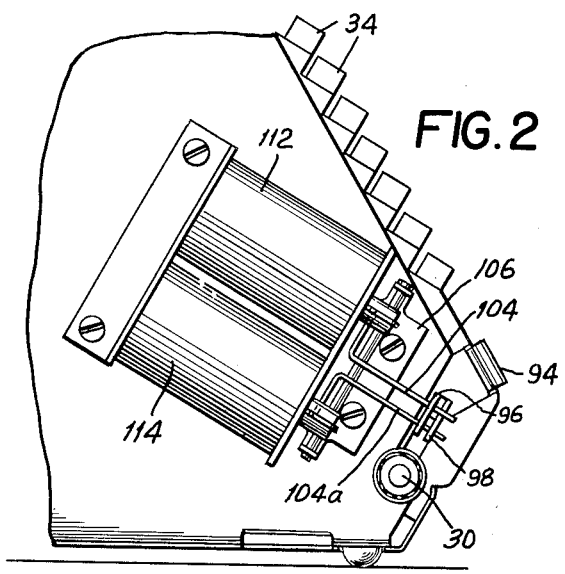
Fig. 2 is a fragmentary elevational view on line 2—2 of Fig. 1.

The reset bars 96 and 98 extend laterally beyond the keyboard at one side thereof and provide in their extending ends a connection for an electromagnetic operating mechanism. Particularly the extending ends of the bars have slots formed therein for receiving the end of reset operating arms 104 and 104a (Figs. 1, 2 and 8). Herein the bar 96 has a slot 102 therein, in which is positioned the end of an upper reset arm 104 and the bar 98 is similarly connected to a lower operating arm 104a. The operating arms 104 and 104a are mounted on a bracket 106 for rocking movement under the influence of the core of an associated solenoid to which the arms are connected. Thus, the reset operating arm 104 is rocked in the bracket upon reciprocation of the solenoid core 108, while the arm 104a is rocked in its supporting bracket upon reciprocation of the solenoid core 110. It will appear, therefore, that energization of the solenoid 112 or the solenoid 114 will cause the cores 108 and 110, respectively, to operate therein, and consequently, the associated bail reset bars will be reciprocated. Appropriate circuit connections for controlling the operation of the solenoids 112 and 114 are provided to include a pair of functional keys in the bank 14, whereby the solenoids may be selectively energized.

The reset bars 96 and 98 each has a series of teeth 116 and 118, respectively. The teeth on the reset bars are positioned to intersect the plane of the lower free edge of the latch bails when either of the reset bars is reciprocated. The number and position of the teeth on the reset bars determine the banks controlled by the bars. Thus, the reset bar 96 is shown as having four teeth at its extreme righthand end, while the bar 98 has four teeth on the extreme lefthand end thereof. As a consequence of this arrangement of teeth, reset bar 96 will control the first four denominational banks, while reset bar 98 will control the last four banks. It is to be understood, of course, that the number and arrangement of the teeth 116 and 118 herein have been arbitrarily selected merely for the purpose of illustrating the principle of operation.

Figure 12:
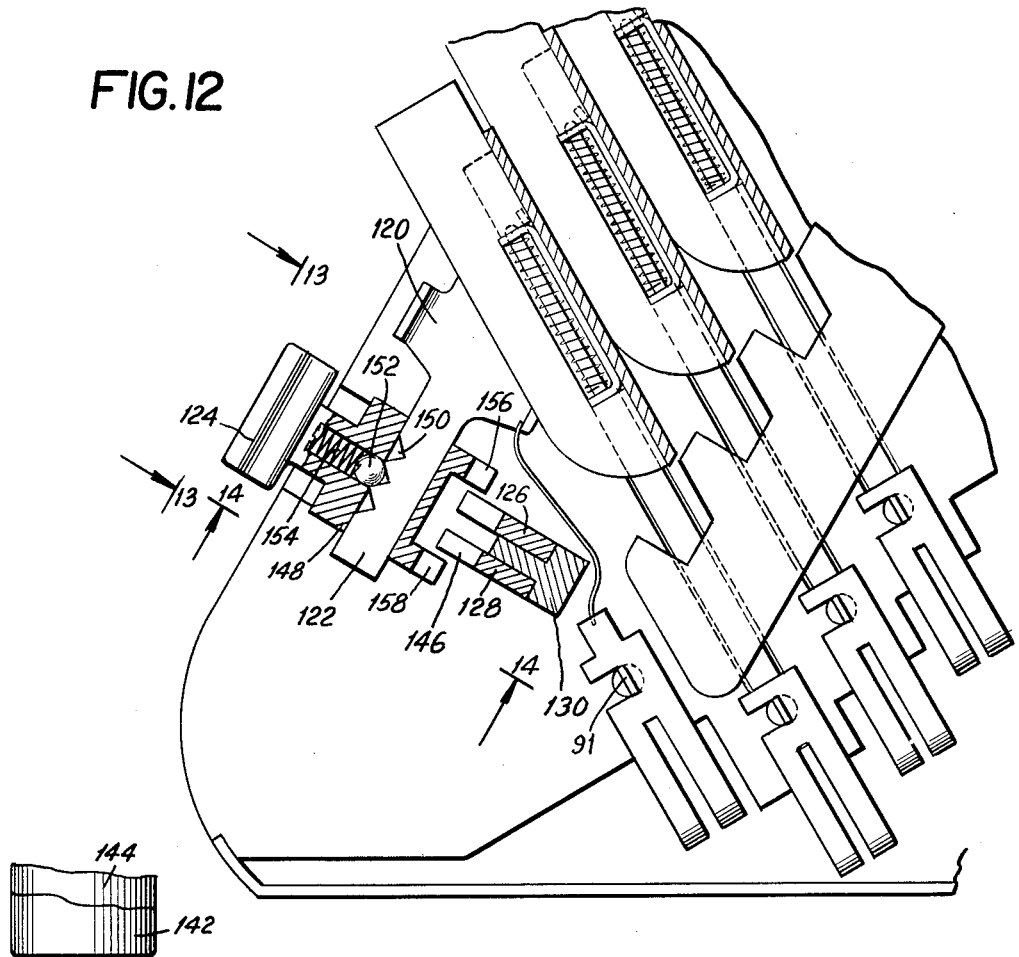
Fig. 12 is a fragmentary sectional view through the lower end of the keyboard, showing modified reset mechanism.
Figure 13:
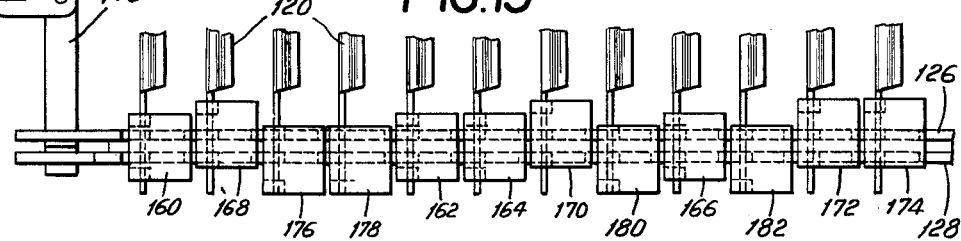
Fig. 13 is a fragmentary plan view of reset mechanism taken on line 13—13 of Fig. 12.
Figure 14:
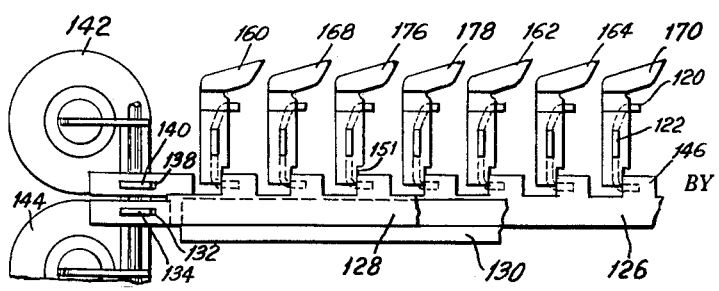
Fig. 14 is a fragmentary view of the reset mechanism taken on line 14—14 of Fig. 12.

In order to lend a greater degree of flexibility to the key resetting mechanism, resort may be had to the arrangement shown in Figs. 12 through 14. In these figures is illustrated a resetting arrangement whereby any one of the key latching bails may be operatively connected with either of two electro-magnetically operated reset bars. On the other hand, the arrangement herein is such that all of the bails may be manually operated at all times quite independently of the electro-magnetically operated reset bars. In Fig. 12 is shown a key latching bail 120, which has a reduced lower end 122, on which end is adjustably mounted a manual resetting key 124. Extending transversely of the common projecting bail ends 122 are a pair of reciprocating reset bars 126 and 128, mounted for reciprocating movement in the reset bar separator 130. The reset bars 126 and 128 project laterally beyond one side of the keyboard to provide connections for electro-magnetic bar operating levers. Specifically, the bar 128 has in its extending end a slot 132, which is adapted to receive a bar rocking lever 134. The bar 136 has in the extending end thereof a slot 138, which is adapted to receive the bar rocking lever 140. The levers 134 and 140 are mounted for rocking movement upon reciprocation of the cores of the solenoids 142 and 144, respectively, to which they are operatively connected.

From the foregoing it follows that energization of the solenoids 142 and 144 and reciprocation of their respective solenoid cores will reciprocate the resetting bars 128 and 126. Each of the resetting bars has a series of projections 146 extending upwardly along the entire upper edge thereof and these projections are so positioned as to contact and rock a connecting ear forming a part of a shiftable manual reset key 124.

The manual reset key 124 has a relatively elongated throat 148, which guides the key for sliding movement along the reduced end of the key bail 122. The reduced end of the key bail has formed in the upper face thereof a series of three notches 150, which serve to locate a detent member 152, which is under constant pressure of the spring 154. A sufficiently large segment of the detent member 152 extends through an aperture in the wall of the throat 148 to establish temporary holding contact between the detent member 152, and one of the notches 150 in the reduced end of the bail 122. Consequently, it is possible to shift the manual reset key 124 into a selected one of three positions corresponding to any one of the notches 150. The detent member 152 will serve to maintain the adjusted position of the reset key when shifted into registration with one of the three notches. The reset key has a depending portion, which includes a pair of shoulders 156 and 158. The depending shoulder portions of the key are spaced sufficiently to straddle and receive therebetween the solenoid operated reset bars 126 and 128. Thus, when the manual reset key 124 is in a reset rod straddling position, as shown in Fig. 12, neither of the reset bars will influence the operation of the bail, but the bail may be manually rocked for resetting a key that may be in latched position.

Should it be desired to connect a bail with the lower of the two reset rods, it is only necessary to shift the reset key into an upper position wherein the depending shoulder 158 will lie in the plane of reciprocation of the projection 146, so that upon reciprocation of the reset bar 128 the bail will be rocked to key releasing position. On the other hand, should it be desired to connect the bail for operation by the reset bar 126, such connection can be easily achieved by shifting the reset key to its lower position of adjustment whereby the shoulder 156 will be influenced by the projection of the upper reset rod 126.

The reset bar connecting function of the shiftable reset keys will be more apparent from an inspection of Fig. 13, wherein the keys 160, 162, 164 and 166 are in a neutral position and are, therefore, conditioned for manual operation only. The keys 168, 170, 172 and 174 are in the innermost position and, therefore, effectively connect their respective key latching bails to the lower reset bar 128. The keys 176, 178, 180 and 182 are in their extreme outer position of adjustment, and consequently, operatively connect their associated key latching bails with the upper reset bar 126. It follows, therefore, that the resetting function of any bail or any combination of bails may be either manually or both manually and mechanically performed depending on the adjusted position of the manual resetting keys.

The light transmitting property of the keys has been referred to hereinbefore, and it is one of the companion objectives of this invention to impart a light dispersing character to the working face of the keys. Ordinarily, with a plane light transmitting face, the light rays will leave the working face of the key stem in substantially parallel relationship. In order to render the light rays clearly visible from positions disposed at an angle to the axis of the key stem, it is the purpose herein to modify the working face of the keys so that the light will be diffused and, therefore, become visible from any position of observation. The mere roughening of the key face, as by sand blasting, will in some measure achieve this objective. Light refracting materials may be fixed to the working end of the keys. Translucent and transparent materials of this type may be made of a variety of substances, as, for example, Celluloid, acrylic plastic, polystyrene, Vinylite and the like. These materials are composed of a mixture of chemicals having different refractional indices which cause a breaking up of the light rays as they pass through the material.

Figure 1A:
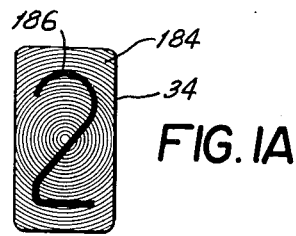
Fig. 1A is a plan view of a light conducting key constituting a part of the keyboard.
Figure 1B:
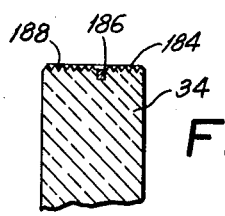
Fig. 1B is a transverse cross-sectional view through the key of Fig. 1A.

In a specific application of the idea, as shown in Figs. 1A and 1B, the face of the Lucite key 34 has been given prism form characteristics by cutting thereon a series of concentric circles 184 with resultant inverted V-shaped ridges 188. This prism-like surface will effectively refract the light being projected through the face of the key.

In order that the denominational value of the key may be clearly indicated both when the key is an unilluminated inoperative position and in an illuminated operative position, it is contemplated that a character 186 be represented in contrasting paint or other material on the face of the key. Most specifically, the character may be engraved into the face of the key and the outline of the engraved character may be filled with a plastic material or a paint of suitable contrasting color. Thus, the value of a non-depressed key may be easily ascertained by noting the character thereon in its natural color. The denomination of an illuminated depressed key will be apparent by the contrast of the opaque facial character with the surrounding illuminated area of the key face.

The ends, back, and bottom of the keyboard mechanism are suitably encased, but for clarity of illustration only a portion of the casing has been illustrated. Suitable end casings are provided and a back and bottom casing 190, on which the separator seats 37 and 39 rest, constitutes the main support for the keyboard structure. As hereinabove suggested, suitable cable passages are provided in the casing for access of necessary cables or connecting wires.

Assuming the keys of the keyboard to be reposed in inoperative position and the bail terminal 84 to be in connection with a suitable source of current, operation of the machine may proceed substantially as follows:

Current impressed on the bail terminals 84 will flow through the key-latching bails 54, thence through the upper bail terminals 82, through any suitable instrumentality (not shown) and to the other side of the line. This current path is established because of the position of the key-latching bails 54, as shown at the left in Fig. 5. It will be noted that the bail springs 60 retain the bails in an inward position in relation to their respective separators, and consequently, the inturned edge 58 of each bail is in contact with the upper end of its respective upper bail terminal 82. At the same time, reference to the bail section at the left of Fig. 4 will show that no current can pass from the inturned edge of the bail to the key contact plate 64, for the reason that the notch 66 in the contact plate is positioned opposite the inturned edge of the bail, thereby providing an insulating space.

Figure 4:
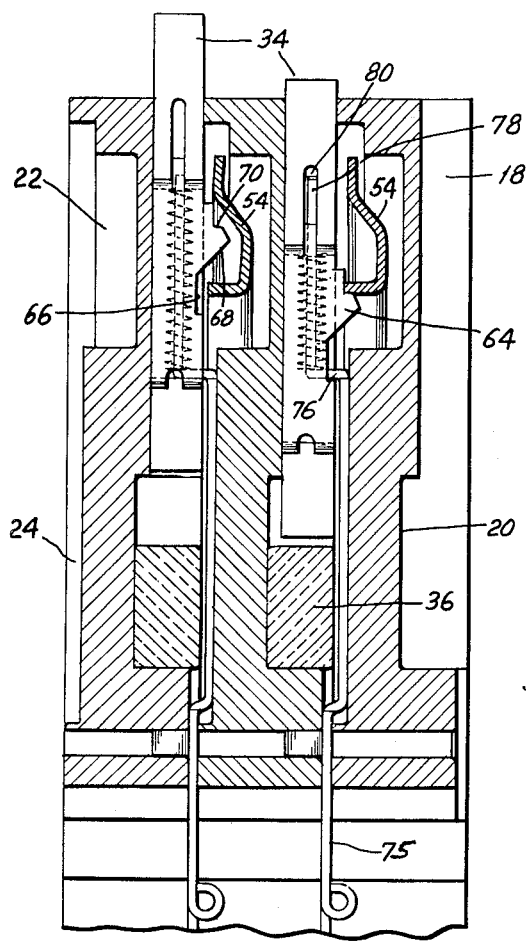
Fig. 4 is a transverse cross-sectional view on line 4—4 of Fig. 3.

Upon depression of a key in any given bank, the associated parts will be disposed as shown at the right of Figs. 4 and 5. The cam face of the key contact plate in this position has been effective to swing the bail 54 in a counterclockwise direction wherein the bail overlies the shoulder of the contact plate and forms therewith an electrical circuit. In this position the key will be held in depressed position. A comparison of the bail position at the right of Fig. 5 will show that the bail 54 has been swung in a counterclockwise direction and the contact between the inturned edge of the bail and the upper end of the bail terminal 82 has been destroyed. Consequently, a circuit path is established from the lower bail terminal 84, through the bail 54, through the key contact plate 64, and consequently, through the terminal of the key that has been depressed.

Depression of a key will project the lower end thereof into the path of light traveling through the light channel 20 and specifically herein through the light transmitting member 36 that has been positioned in the channel. Previously, of course, the color selecting finger 52 may have been manipulated to bring one of the color screens 50a or 50b into the beam of light emanating from the light source 42 and passing through the light window 64 into the light transmitting channel under the bank of keys. As a result of this relationship, the face of a depressed key will be well illuminated and have imparted thereto a distinction setting the key off from all other keys of the bank, so that a mere glance at the keyboard will apprise the operator of any key that has been depressed.

All keys that have been depressed will remain in a depressed position with the resultant maintenance of the current paths that have been established, and a keyboard may remain set in such position as long as desired for repeated cyclic operation. However, should it be desired to reset any of the banks, such operation may follow at the option of the operator either by manually operating the reset keys 94 (Figs. 1 through 10) or 124 (Figs. 12 through 14).

Electro-mechanical resetting of any selected number of banks may also be resorted to by use of the electro-mechanically operated reset bars, as hereinbefore described. It follows, therefore, that the keyboard has complete flexibility. Any one of the banks may be reset at any time and thereby removed from operation, other banks may remain set, and additional keys may be depressed for integrating into the system additional or different data at any time as conditions may require.

What is claimed is:

1. In a keyboard structure, a plurality of denominational banks of keys, a key-latching bail associated with each key bank, a reset key carried by each of said key-latching bails for manually resetting said bails individually, a pair of reset bars in common association with said bails, and means associated with each of said reset keys for selectively connecting any of said bails in operative relation with either of said reset bars.

2. In a keyboard structure, a plurality of denominational banks of keys, a key-latching bail associated with each key bank, a manual reset key carried by each of said key-latching bails for resetting said bails individually, a plurality of reset bars, and means associated with each of said reset keys for selectively connecting any of said bails with a selected one of the reset bars.

3. In a keyboard structure, a plurality of denominational banks of keys, a key-latching bail associated with each key bank, manual reset keys carried by each of said key-latching bails for individually resetting the same, two reset bars in common association with said bails, and means associated with each of said reset keys for selectively connecting any of said bails with either of the reset bars.

4. In a keyboard structure, a plurality of denominational banks of keys, a key-latching bail associated with each key bank, means including a key slidably mounted on each of said bails for manually operating said bails individually, a common reset bar arranged in transverse relation to said bails, a reset bar contact surface on each of said sliding keys, and a corresponding contact surface on said common reset bar for each of said key carried contact surfaces, whereby sliding movement of said keys is adapted to selectively connect any of said bails in operative relation with said reset bar.

5. In a keyboard structure, a plurality of denominational banks of keys, a key-latching bail associated with each key bank, a plurality of common reset bars associated with said bails, and a manual reset key longitudinally shiftable along each of said bails and into operative contact with a selected one of said reset bars for selectively connecting any of said bails with a selected one of the reset bars.

6. In a keyboard structure, a plurality of denominational banks of keys, a key-latching bail associated with each key bank, means including a key slidably mounted on each of said bails for manually resetting said bails individually, a pair of reset bars in common association with said bails, and means including said shiftable keys for selectively connecting any of said bails in operative relation with either of said reset bars.

7. In a keyboard structure, a plurality of denominational banks of keys, a key-latching bail associated with each key bank, manual means including a key slidably mounted on each of said bails for resetting said bails individually, a plurality of reset bars, and means including said slidable keys for selectively connecting any of said bails with a selected one of the reset bars.

8. In a keyboard structure, a plurality of denominational banks of keys, a key-latching bail associated with each key bank, manual means including a key slidably mounted on each of said bails for individually resetting the same, two reset bars in common association with said bails, and means including said slidable keys for selectively connecting any of said bails with either of the reset bars.

9. In an electrical keyboard, a non-conducting key bank support having an elongated body of substantial width and thickness, a keyway in one face of said support, a non-conducting key mounted in said keyway for reciprocating movement therein, a conducting key-latching bail extending across said key and being mounted for movement into and out of key-latching position, an electrical connector associated with each end of said bail, and means for breaking a circuit path through said bail at one of said connectors.

10. In an electrical keyboard, a non-conducting key bank support having an elongated body of substantial width and thickness, a keyway in one face of said support, a non-conducting key mounted in said keyway for reciprocating movement therein, a conducting key-latching bail extending across said key and being mounted for movement into and out of key-latching position, an electrical connector associated with one end of said bail for make-and-break contact, an electrical connector fixed to the other end of said bail, and means for breaking the contact between said bail and said first named connector.

11. In an electrical keyboard, a non-conducting key bank support having an elongated body of substantial width and thickness, a keyway in one face of said support, a non-conducting key mounted in said keyway for reciprocating movement therein, a conducting key-latching bail extending across said key and being mounted for rocking movement into and out of key-latching position, an electrical connector associated with each end of said bail, and a cam-shaped electrical contact plate carried by said key and extending into the path of said bail for rocking said bail to thereby break the circuit path through said bail at one of said connectors.

12. In an electrical keyboard, a non-conducting key bank support having an elongated body of substantial width and thickness, a keyway in one face of said support, a non-conducting key mounted in said keyway for reciprocating movement therein, an electrically energized key-latching bail extending across said key and being mounted for movement into and out of key-latching position, an electrical terminal mounted on said support in proximity to said key, a cam-shaped electrical contact member carried by said key and extending into the path of said bail for key-latching engagement therewith upon reciprocation of said key, and an electrical connection between said terminal and said contact member.

13. In an electrical keyboard, a non-conducting key bank support having an elongated body of substantial width and thickness, a keyway in one face of said support, a non-conducting key mounted in said keyway for reciprocating movement therein, a conducting key-latching bail extending across said key and being mounted for rocking movement into and out of key-latching position, an electrical connector fixed to one end of said bail, an electrical connector separably associated with the other end of said bail, and means for breaking the circuit path through said bail at said separable connector comprising, an electrical terminal mounted on said support in proximity to said key, an electrical contact member carried by said key, an electrical connection between said contact member and said terminal, and a bail contacting and rocking face on said contact member extending into the path of said bail, whereby depression of the key will rock said bail to break the circuit path at said separable connector and establish a circuit path from said bail, through said contact member and said terminal.

14. In an electrical keyboard, a non-conducting key bank support having an elongated body of substantial width and thickness, a plurality of keyways in one face of said support, non-conducting keys mounted in said keyways for reciprocating movement therein, a conducting key-latching bail extending across said keys and being mounted on said support for rocking movement into and out of key-latching position, an electrical connector fixed to one end of said bail, an electrical terminal mounted on said support at the other end of said bail for normal contact therewith, an electrical terminal mounted on said support in proximity to each of the keys thereof, a contact plate carried by each of said keys, an electrical connection between the contact plate of each key and its terminal, and a bail contacting and rocking face on said contact members extending into the path of said bail, whereby depression of a key will rock said bail to break the current path at the second named end of said bail and establish a current path from said bail, through the contact member and terminal of such depressed key.

15. In a keyboard structure, a key support having a key guideway therein, a key supported for reciprocating movement in said guideway, a recess in said key, a slot extending upwardly from said recess, an electrical contact plate having inbent free ends in contact with the end walls of said recess, a key terminal having an offset shoulder extending into the bottom of said recess, a guide staff extending upwardly from said shoulder and into the slot above said recess, means securing the other end of said terminal to said support, and a spring surrounding said staff and having its ends respectively in contact with said offset shoulder and one of said inbent free ends.

References Cited in the file of this patent

UNITED STATES PATENTS

| | | |
|---|---|---|
| 1,808,213 | Eichenauer | June 2, 1931 |
| 2,059,652 | Pott | Nov. 3, 1936 |
| 2,174,150 | Beria | Sept. 26, 1939 |
| 2,176,640 | Payne | Oct. 17, 1939 |
| 2,293,127 | Fishack et al. | Aug. 18, 1942 |
| 2,307,245 | Sundstrand | Jan. 5, 1943 |
| 2,346,834 | Friden et al. | Apr. 18, 1944 |
| 2,543,899 | Dickinson | Mar. 6, 1951 |
| 2,590,335 | Maffie | Mar. 25, 1952 |